United States Patent [19]

Siband

[11] Patent Number: 4,794,703

[45] Date of Patent: Jan. 3, 1989

[54] NAVIGATIONAL INSTRUMENT FOR CONTROLLING THE STABILITY OF A MOBILE DEVICE

[76] Inventor: Jean-Louis Siband, 12 Place Charles de Gaulle, 86000-Poitiers, France

[21] Appl. No.: 16,735

[22] Filed: Feb. 20, 1987

[30] Foreign Application Priority Data

Feb. 20, 1986 [FR] France .................. 86 02469

[51] Int. Cl.[4] .............................................. G01C 9/06
[52] U.S. Cl. ...................................... 33/366; 33/363 Q
[58] Field of Search ............................... 33/366, 363 Q

[56] References Cited

U.S. PATENT DOCUMENTS

| | | | |
|---|---|---|---|
| 1,988,458 | 1/1935 | Minorsky | 33/363 Q |
| 3,490,153 | 1/1970 | Harris . | |
| 3,727,180 | 4/1973 | Lingel et al. | 33/366 X |
| 3,791,042 | 2/1974 | Bell | 33/366 X |
| 4,094,073 | 6/1978 | Parra | 33/366 |
| 4,507,965 | 4/1985 | Stratton et al. | 33/366 X |

FOREIGN PATENT DOCUMENTS 3215284 10/1983 Fed. Rep. of Germany .

Primary Examiner—William D. Martin, Jr.
Attorney, Agent, or Firm—Parkhurst, Oliff & Berridge

[57] ABSTRACT

The invention relates to a navigational instrument for automatically controlling the stability of a mobile target, or locating the position of the target with respect to one of several reference planes. The arrangement includes a moving part A whose base G is weighted so that the moving part takes the form of an anchor which pivots about an axis B located on a fixed part fastened to or defined by the moving target. The base G of the moving part has two arms. In an AC embodiment of the invention, the arms are provided with electrically conductive windings and the fixed part includes two electrically conductive windings energized by alternating current. If the fixed part is tilted, one of the windings in the moving part will penetrate the fixed winding to a depth proportional to the tilt angle. At this point, an alternating current, proportional to the tilt angle, will be induced in the winding in the moving part. In another embodiment using a DC power source, the winding on the elements is replaced by variable resistor or potentiometer whose slide is actuated by a corresponding one of the moving anchor arms.

6 Claims, 1 Drawing Sheet

NAVIGATIONAL INSTRUMENT FOR CONTROLLING THE STABILITY OF A MOBILE DEVICE

BACKGROUND OF THE INVENTION

The present invention relates to a navigational instrument which provides an active mechanism for automatically controlling the position of a moving device, and a passive mechanism for locating the position of the moving device with respect to a reference plane. The navigational instrument is particularly suitable for the automatic control of all types of moving devices such as surface, aerial, marine or submarine moving targets, under either manual or radio guidance.

There is a need for mechanisms which actively and automatically control the position of a moving device in a medium subject to gravity. For example, in the case of a moving target, it is often necessary to control the target to ensure the stability of the horizontal fuselage during banking. Moreover, passive mechanisms are necessary to locate the position of the moving device with respect to a reference plane.

It is an object of the present invention to provide a reliable and low-cost navigational instrument.

It is a further object of the present invention to provide a navigational instrument for actively and automatically controlling the position of a moving device.

It is an additional object of the invention to provide a navigational instrument having a passive mode in which the position of the moving device can be located with respect to a reference plane.

SUMMARY OF THE INVENTION

To achieve these and other objects, the present invention relates to a navigational instrument for automatically controlling the stability of a mobile device moving in a medium subject to gravity, or locating the position of the mobile device with respect to at least one reference plane. The navigational instrument includes a moving part having a base weighted to form an anchor and an opposite end pivotally mounted about an axis. An arm extends from each side of the moving part with each arm being provided with an electrically conductive first material. A fixed part is secured to the reference plane and includes an element arrangement on each side of the moving part. Each element has an electrically conductive second material for selectively co-operating electronically with the first material on a corresponding one of the arms of the moving part. A current source is connected to one of the first and second materials.

The moving part has a rest position which permits a preset threshold of electrical cooperation between the first and second materials. The moving part also has a tilted position in which a tilt angle is defined between the moving part and the reference plane, the tilt angle being proportional to the change in electrical cooperation between the first and second materials relative to the preset threshold.

In a preferred embodiment, the current source is a AC current source, the first material of each arm is an electrically conductive solenoid first winding, and the second material of each element is an electrically conductive solenoid second winding. One winding may have a diameter smaller than the other winding. In the tilted position, the smaller diameter winding penetrates the corresponding larger diameter winding. The tilt angle is thus proportional to the degree of penetration of the smaller diameter winding into the corresponding larger diameter winding, and thus proportional to the amount of current induced in the windings.

In another preferred embodiment, the current source is a DC current source in which each element of the fixed part (or arm of the moving part) is provided with a variable resistor having a slide actuated by a corresponding arm of the moving part (or element of the fixed part). Direct current passes through the variable resistor in amount proportional to the tilt angle.

BRIEF DESCRIPTION OF THE DRAWINGS

The invention will be described in detail herein with reference to the attached drawings in which like reference letters refer to like elements, and wherein.

DETAILED DESCRIPTION OF THE PREFERRED EMBODIMENTS

The invention will be described hereinafter with reference to the use of the inventive navigational instrument in a moving target. However, those skilled in the art recognize that the navigational instrument is suitable for use with any moving device such as surface, aerial, marine or submarine devices, under either manual or radio guidance. Moreover, the moving target is movable in any medium subject to gravity, such as any liquid, gas or solid medium through which the device may be moved.

Figure 1:
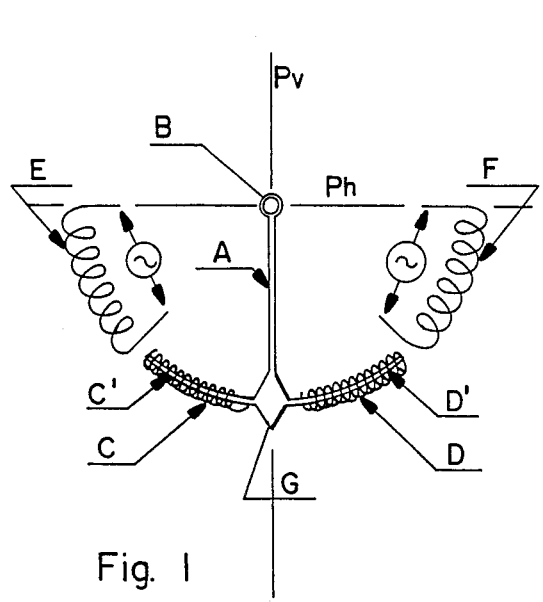
FIG. 1 is an illustration of an AC powered embodiment of the inventive navigational instrument with the moving part in a neutral or rest position.

The navigational instrument according to the present invention allows the moving target to be controlled in any position with reference to a horizontal plane Ph or vertical plane Pv, as illustrated in FIG. 1. Moreover, the navigational instrument according to the present invention permits the location of the position of the moving target with reference to the horizontal or vertical planes Ph, Pv.

In a preferred embodiment, the navigational instrument includes moving part A supported in the moving target and having one end which is mounted for pivotal movement about an axis B preferably located at the intersection of the horizontal and vertical planes. An opposite end of the moving part A defines a base G which is weighted to take the form of an anchor as shown in FIG. 1. The moving part A preferably includes two arms C', D' each of which extends from one side of the base G. Preferably, the two arms C', D' of the moving part A are provided with electric solenoid windings C, D arranged in opposite directions with respect to the central axis of the arms C', D'.

The navigational instrument further includes a fixed part mounted in a reference plane Pr. In FIG. 1 the reference plane Pr coincides with the horizontal plane Ph. The fixed part may be located in a support structure fastened to the moving target, or a fixed portion of the moving target itself. The fixed part preferably includes two electric solenoid windings E, F arranged in opposite directions about the central axis of the moving part. The windings E, F on the fixed part are arranged on either side of the arms C', D' of the moving part A, and preferably symmetrically located on opposite sides of the moving part A. In this embodiment, the windings E, F on the fixed part each have a diameter greater than that of the windings C, D of the arms, but the opposite situation is possible.

FIG. 1 illustrates the navigational instrument at rest and used with an alternating current (AC) power source. In the illustrative rest position, an alternating current passes through the windings E, F about the fixed part while the windings C, D about the arms C', D' of the moving part A are deenergized. Those skilled in the art recognize that the reverse arrangement is also possible. That is, in the rest position, the alternating current can pass through the windings C, D about the arms C', D' of the moving part A while the windings E, F of the fixed part are deenergized. The description herein, however, will assume that an AC current source is connected to the windings, E, F of the fixed part.

Figure 3:
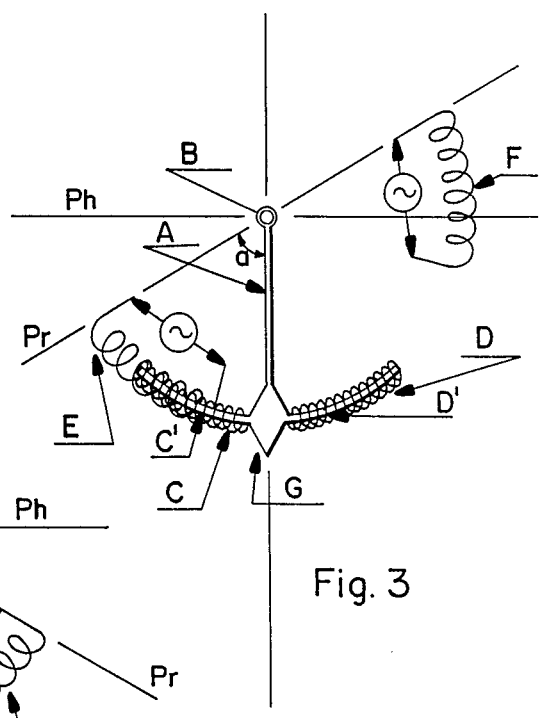
FIG. 3 is an illustration of the navigational instrument similar to FIG. 2 but showing the moving part in an opposite tilted position.
Figure 2:
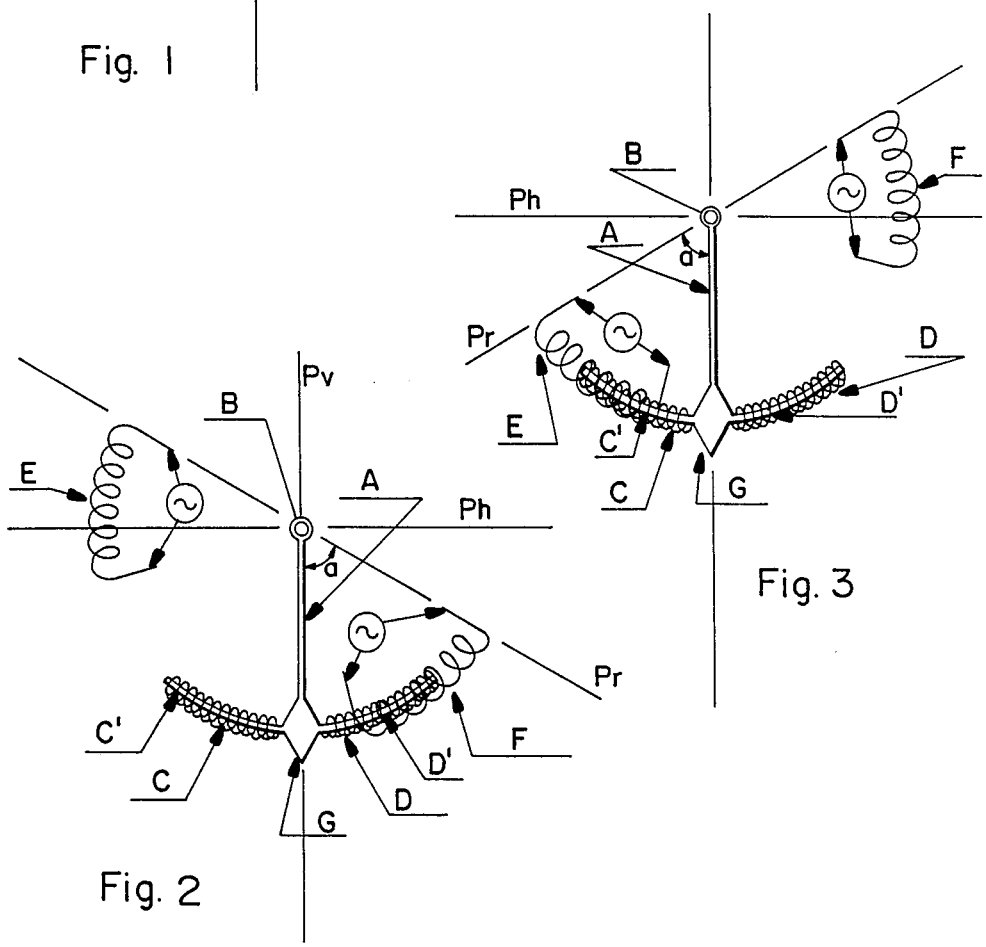
FIG. 2 is an illustration of the navigational instrument of FIG. 1 with the moving part in a tilted position.

In operation, when the reference plane of the moving target is tilted with respect to the horizontal or vertical plane (thereby tilting the fixed part), the winding on one of the corresponding arms C', D' of the moving part A penetrates the corresponding one of the windings E, F to a depth which will be proportional to the a angle a between the moving part A and the reference plane Pr. FIG. 2 illustrates tilting of the moving target so that the winding D on arm D' of the moving part penetrates the winding F of the fixed part. FIG. 3 illustrates tilting in the opposite direction.

Upon tilting, a current proportional to the tilt angle a, and thus to the tilt angle of the moving target with respect to the reference plane (see FIGS. 2 and 3) will be induced in the winding mounted on the arm which penetrates the winding on the fixed part. This inductance current, which may be amplified or even rectified if necessary, is transmitted toward a sensing and control system (not shown) which will influence the stabilizer or flap controls of the moving target. Alternatively, the control system will inform the pilot or operator (in the case of a radio controlled moving target) of the position of the moving target with respect to the reference plane.

When the moving target banks (as in the case of an aerial target, for example), the resulting centrifugal forces cancel out gravitational forces acting on the moving part A so that the moving part will remain in its rest position as illustrated in FIG. 1. Preferably, in the rest position, no inductance occurs in the windings arranged around the arms of the moving part. On the other hand, if centrifugal forces fall below or exceed gravitational forces acting on the moving part, the tilt angle of the moving target becomes excessive or insufficient (relative to a threshold tilt angle). One of the arms of the moving part will thus penetrate one of the corresponding fixed windings and an inductance current proportional to the insufficient or excessive tilt angle will be detected by the sensing and control system.

Those skilled in the art recognize that the rest position of the moving part may be modified to account for a threshold tilt angle such that the moving part permits a threshold of current to be induced in the windings on the moveable arms. Any subsequent tilting relative to the threshold tilt angle will vary the inductance relative to the preset current threshold, thereby indicating a change in tilt angle. Those skilled in the art further recognize that the threshold current may be zero or negligible such that any induced current is proportional to the tilt angle.

The direction in which the windings are wound is not critical. Preferably, the windings are wound in opposite directions with respect to the axis of the moving part to ensure perfect system symmetry. The axis of the moving part is defined by the line between the axis B about which the moving part pivots and the base G.

In this preferred embodiment, the moving part pivots about the axis B and includes two arms C', D'. Those skilled in the art recognize that this embodiment may be modified such that the moving part pivots about several axes intersecting the axis B, and includes several arms cooperating with a corresponding number of elements.

Figure 4:
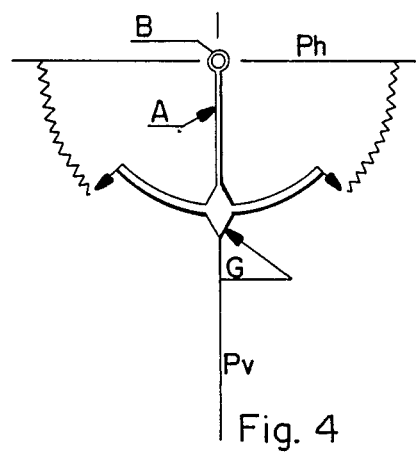
FIG. 4 is an illustration of another embodiment of the inventive navigational instrument suitable for use with DC power sources.

The system described above operates if alternating current (AC) power is available. However, the inventive system can be modified to operate on direct current (DC) power. FIG. 4 illustrates an embodiment of the invention in which the invention is modified to operate from a DC power source.

If only DC power is available, the windings E, F of the fixed part are substituted with variable resistors or potentiometers whose slides are actuated by the arms of the moving parts. In this embodiment, the arms of the moving part are not provided with windings. When the entire system tilts as described above, resistance will vary, and this variation can be applied to an electronic system which will act on the control as described above with reference to the first AC embodiment. Opposite corresponding structure is also possible, i.e., the arms C', D' of the moving part can be provided with resistors or potentiometers whose slides are actuated by the elements of the fixed parts.

Those skilled in the art recognize that two devices in accordance with the present invention, arranged at right angles to one another, are sufficient to ensure the lateral and longitudinal stability of the moving target or to locate its lateral and longitudinal position.

The system according to the present invention provides a particularly suitable active means of automatically controlling the position of a moving device, whether that moving device is a self-powered surface, aerial, marine or submarine moving target, under either manual or radio guidance, in a medium subject to gravity. In the case of a moving target the system can be employed, for example control an arrangement ensuring horizontal fuselage stability during banking.

Moreover, the inventive navigational system can operate in a passive mode so that the position of a moving target can be located with respect to a reference plane. In the passive mode, the inventive system provides an especially useful, simple, reliable and low cost navigational instrument. When so employed, the inventive navigational system can be used to trigger an alarm or safety system whenever the aircraft's position reaches a critical threshold with respect to one or more reference planes. The triggering of an alarm or safety system is of particular importance when the navigational system is used in an aircraft, for example, under foggy, cloudy or similar conditions when the reference planes are invisible to the pilot. In other applications, the inventive navigational system can be used to provide an accurate leveling device.

The principles, preferred embodiments and modes of operation of the present invention have been described in detail in the foregoing specification. The invention which is intended to be protected herein, however, is not to be construed as limited to the particular forms disclosed, but should be regarded as illustrative rather than restrictive. Variations and changes may be made by those skilled in the art without departing from the spirit of the invention.

What is claimed is:

1. A navigational instrument for automatically controlling stability of a mobile device moving in a medium subject to gravity, or locating the position of the mobile device with respect to at least one reference plane, said navigational instrument comprising:

a moving part having a base weighted to form an anchor and an opposite end pivotally mounted about an axis, an arm extending from each side of said moving part, each arm being provided with an electrically conductive solenoid first winding having a first diameter, a fixed part secured to said reference plane and including an element arranged on each side of said moving part, each element having an electrically conductive solenoid second winding having a second diameter and connected to AC current source, each second winding overlapping at least a portion of a corresponding one of the first windings upon movement of the moving part relative to the fixed part for selectively directly inducing current in a corresponding one of the first windings on a corresponding one the arms of said moving part; and said moving part having a rest position which permits a preset threshold of induced current in one of the first windings, and a tilted position in which a tilt angle is defined between said moving part and said reference plane, said tilt angle being proportional to the change in the current induced between the first and second windings relative to the preset threshold of current.

2. The navigational instrument of claim 1, wherein said arms are arranged symmetrically on each side of said base.

3. The navigational instrument of claim 1, wherein said arms are arranged symmetrically on each side of said base, and said elements are arranged symmetrically on each side of said moving part.

4. The navigational instrument of claim 1 wherein said elements are arranged symmetrically on each side of said moving part.

5. The navigational instrument of claim 1 wherein the rest position of the moving part permits AC current in the second windings and prevents inducement of current in the first windings to establish a negligible preset threshold of induced current, and said tilt angle in the tilted position is proportional to the current induced in the first winding.

6. The navigational instrument of claim 1 wherein the first winding has a diameter less than the diameter of the second winding, and the first winding penetrates the second winding in the tilted position, the tilt angle being proportional to the degree of penetration of the first winding into the second winding.

* * * * *